United States Patent [19]

Factor et al.

[11] Patent Number: 4,948,718
[45] Date of Patent: Aug. 14, 1990

[54] PHOTOGRAPHIC SILVER HALIDE ELEMENTS CONTAINING SOLID PARTICLE DISPERSIONS OF DYES

[75] Inventors: Ronda E. Factor; Donald R. Diehl, both of Rochester, N.Y.

[73] Assignee: Eastman Kodak Company, Rochester, N.Y.

[21] Appl. No.: 372,142

[22] Filed: Jun. 27, 1989

Related U.S. Application Data

[63] Continuation of Ser. No. 137,402, Dec. 23, 1987, abandoned.

[51] Int. Cl.$^5$ ................................................ G03C 1/34
[52] U.S. Cl. .................................... 430/522; 430/510; 430/512; 430/517; 514/212
[58] Field of Search ............... 430/510, 512, 517, 522; 514/212

[56] References Cited

U.S. PATENT DOCUMENTS

| | | | |
|---|---|---|---|
| 2,527,583 | 10/1950 | Silberstein et al. | 95/2 |
| 3,282,699 | 11/1966 | Jones et al. | 96/84 |
| 4,092,168 | 5/1978 | Lemahieu et al. | |
| 4,110,115 | 8/1978 | Sugiyama et al. | 96/84 |
| 4,294,916 | 10/1981 | Postle et al. | |
| 4,294,917 | 10/1981 | Postle et al. | |
| 4,542,091 | 9/1985 | Sasaki et al. | 430/380 |

FOREIGN PATENT DOCUMENTS 59-113434  6/1984  Japan .

*Primary Examiner*—Jack P. Brammer
*Attorney, Agent, or Firm*—Paul L. Marshall

[57] ABSTRACT

Solid particle dispersions of dyes according to the formula:

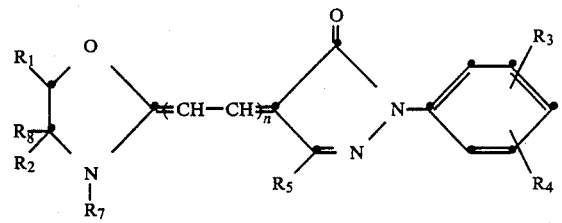

are useful as filter dyes in photographic elements.

In this formula, $R_1$ and $R_2$ are each independently substituted or unsubstituted alkyl or substituted or unsubstituted aryl, or together represent the atoms necessary to complete a substituted or unsubstituted 5- or 6-membered ring.

$R_3$ and $R_4$ each independently represents H, substituted or unsubstituted alkyl, substituted or unsubstituted aryl, $CO_2H$, or $NHSO_2R_6$. $R_5$ is H, substituted or unsubstituted alkyl, substituted or unsubstituted aryl, carboxylate, or substituted or unsubstituted acyl, $R_6$ and $R_7$ are each independently substituted or unsubstituted alkyl or substituted or unsubstituted aryl, and n is 1 or 2. $R_8$ is either substituted or unsubstituted alkyl, or is part of a double bond between the ring carbon atoms to which $R_1$ and $R_2$ are attached. At least one of the aryl rings of the dye molecule must have at least one substituent that is $CO_2H$ or $NHSO_2R_6$.

5 Claims, No Drawings

PHOTOGRAPHIC SILVER HALIDE ELEMENTS CONTAINING SOLID PARTICLE DISPERSIONS OF DYES

This is a continuation of application Ser. No. 137,402, filed Dec. 23, 1987, now abandoned.

FIELD OF THE INVENTION

This invention relates to dyes, particularly dyes useful as filter dyes, especially in photographic elements.

BACKGROUND OF THE INVENTION

Photographic materials often contain filter dyes to absorb light from different regions of the spectrum, such as red, blue, green, ultraviolet, and infrared, to name a few. These filter dyes are often required to perform the function of absorbing light during exposure of the material so as to prevent or at least inhibit light of a region of the spectrum from reaching at least one of the radiation-sensitive layers of the element.

After processing of the element, however, the continued presence of the filter dye will adversely affect the image quality of the photographic material. It is therefore desirable to use filter dyes that will be solubilized and removed or at least decolorized during photographic processing. Dyes that are easily solubilized, however, tend to wander throughout the photographic material during coating, adversely affecting the final image quality.

To prevent dye wandering, the dyes are often coated with a mordant to bind the dye in the layer in which it is coated. Dye mordants, while often useful, tend to either bind the dye too strongly, inhibiting solubilization of the dye during photographic processing, or too weakly, thus not preventing dye wandering.

It would therefore be highly desirable to provide a filter dye for use in photographic elements that does not wander during coating, is fully solubilized during processing, and does not require a mordant.

SUMMARY OF THE INVENTION

According to the invention, there is provided a solid particle dispersion of a dye of the formula:

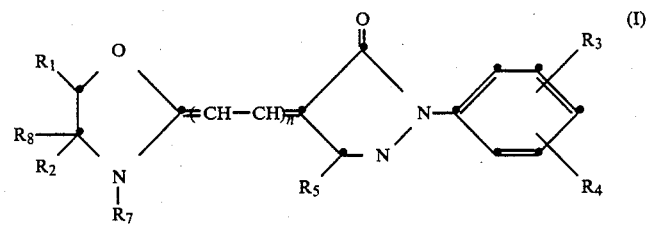

(I)

In formula (I), $R_1$ and $R_2$ are each independently substituted or unsubstituted alkyl or substituted or unsubstituted aryl, or together represent the atoms necessary to complete a substituted or unsubstituted 5- or 6-membered ring.

$R_3$ and $R_4$ each independently represents H, substituted or unsubstituted alkyl, substituted or unsubstituted aryl, $CO_2H$, or $NHSO_2R_6$. $R_5$ is H, substituted or unsubstituted alkyl, substituted or unsubstituted aryl, carboxylate (i.e., COOR where R is substituted or unsubstituted alkyl), or substituted or unsubstituted acyl, $R_6$ and $R_7$ are each independently substituted or unsubstituted alkyl or substituted or unsubstituted aryl, and n is 1 or 2. $R_8$ is either substituted or unsubstituted alkyl, or is part of a double bond between the ring carbon atoms to which $R_1$ and $R_2$ are attached. At least one of the aryl rings of the dye molecule must have at least one substituent that is $CO_2H$ or $NHSO_2R_6$.

The dyes of the invention are useful as general purpose filter dyes, alone or in combination with other filter dyes in photographic elements. They are insoluble at coating pH's of below 6 (generally 4 to 6) and very soluble at processing pH's of above 8 (generally 8 to 12), so that they do not interact with other components of the photographic element, yet still are fully solubilized during photographic processing.

DESCRIPTION OF THE PREFERRED EMBODIMENTS

According to formula (I), $R_1$, $R_2$, $R_3$, $R_4$, $R_5$, $R_6$, and $R_7$ may each be substituted or unsubstituted alkyl or substituted or unsubstituted aryl, preferably substituted or unsubstituted alkyl of 1 to 6 carbon atoms or substituted or unsubstituted aryl of 6 to 12 carbon atoms. $R_8$ may be substituted or unsubstituted alkyl of from 1 to 6 carbon atoms. Additionally, $R_5$ may be substituted or unsubstituted acyl or carboxylate of from 1 to 6 carbon atoms. These groups may be substituted with any of a number of substituents as is known in the art, other than those, such as sulfo substituents, that would tend to increase the solubility of the dye so much as to cause it to become soluble at coating pH's. Examples of useful substituents include halogen, alkoxy, ester, amide, acyl, alkenyl, and alkylamino. Examples of alkyl groups include methyl, ethyl, n-propyl, isopropyl, n-butyl, isobutyl, n-pentyl, t-butyl, isopentyl, and n-hexyl. Examples of aryl groups include phenyl, naphthyl, styryl, heterocyclyl, and pyridyl.

$R_1$ and $R_2$ may also together represent the atoms necessary to complete a substituted or unsubstituted 5- or 6-membered ring, such as phenyl, naphthyl, cyclohexyl, and pyridyl. This ring may be substituted with substituents, other than those, such as sulfo substituents, that would tend to increase the solubility of the dye so much as to cause it to become soluble at coating pH's. Examples of useful substituents include halogen, alkyl, alkoxy, ester, amido, acyl, and alkylamino.

Examples of dyes according to formula (I) include the following:

1
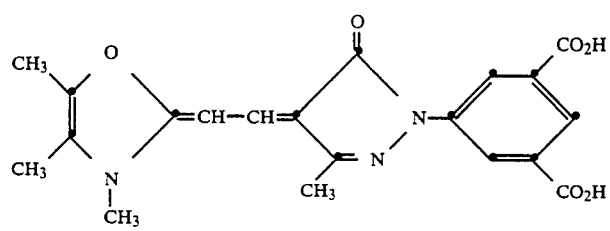
2
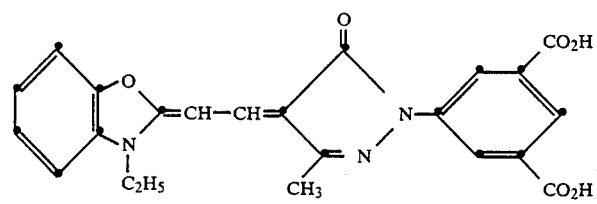
3
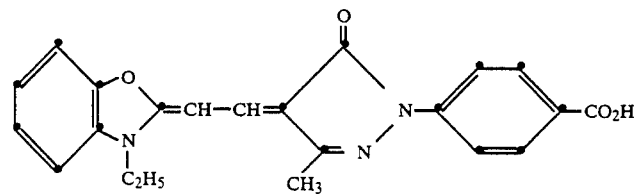
4
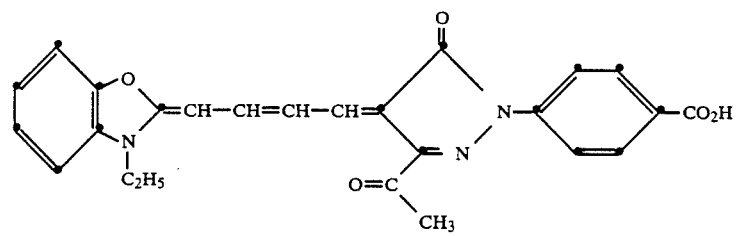
5
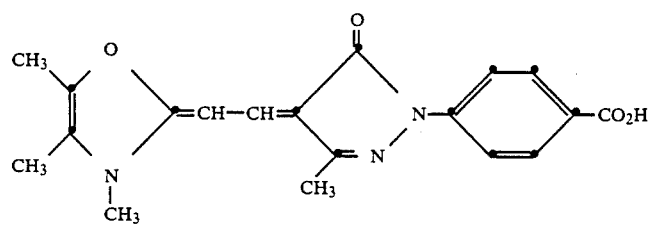
6
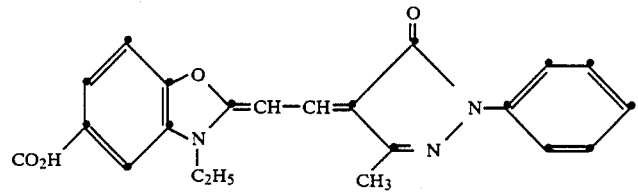
7
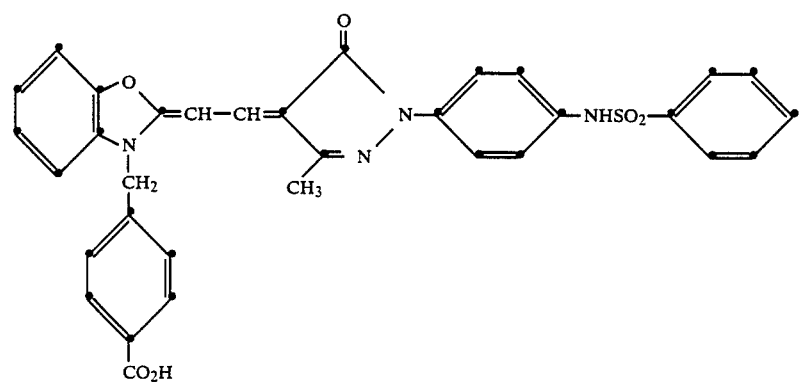

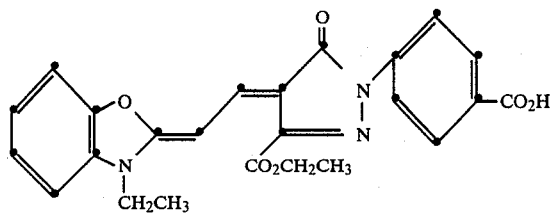 8
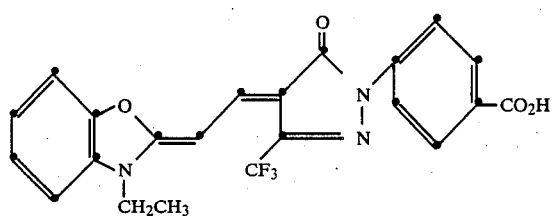 9
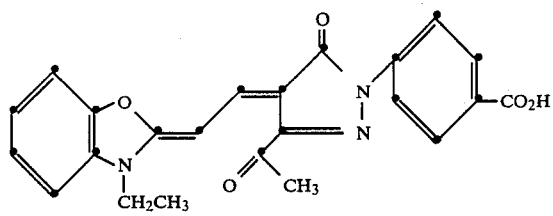 10
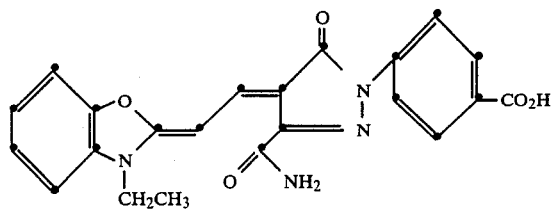 11
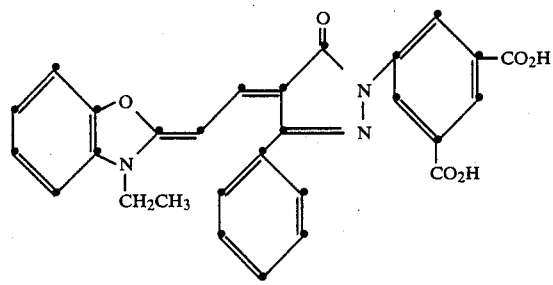 12
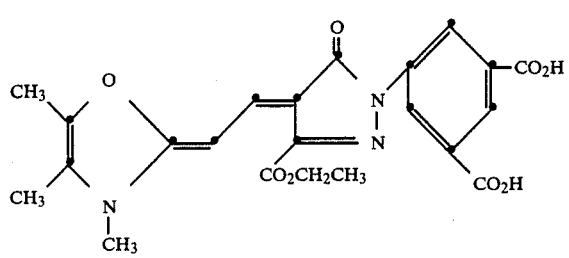 13

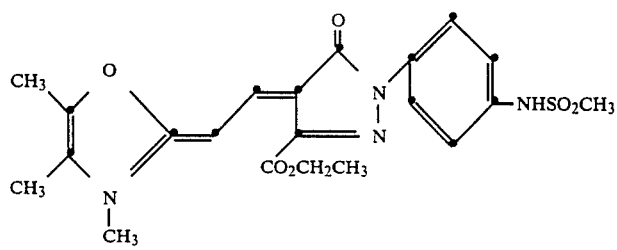
14
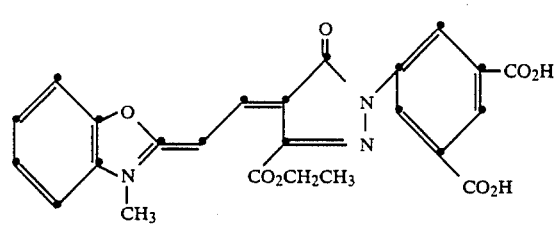
15
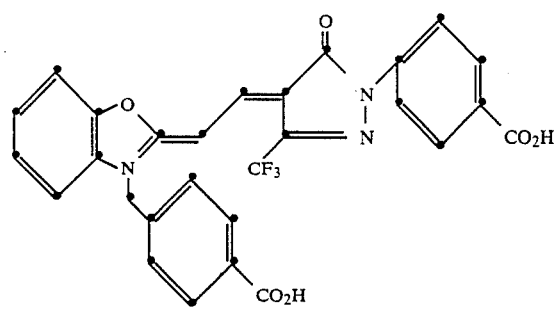
16
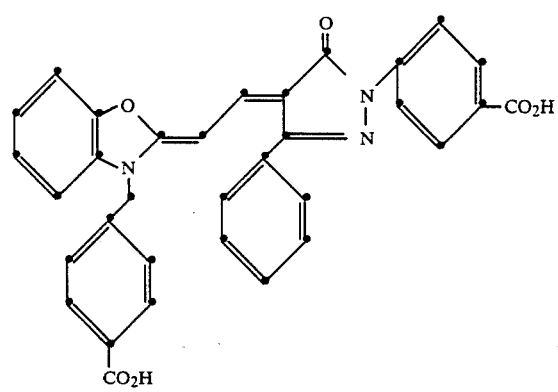
17
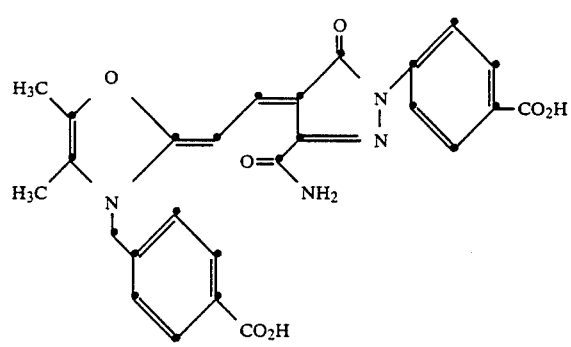
18

-continued
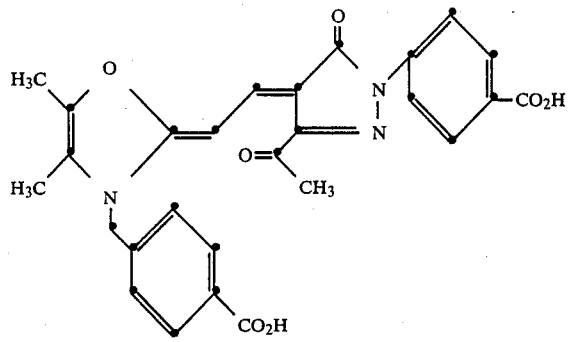
19
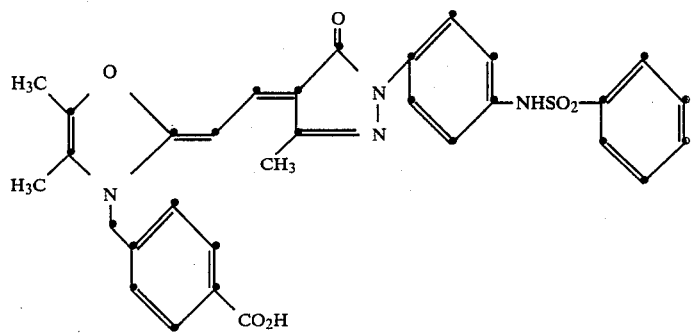
20
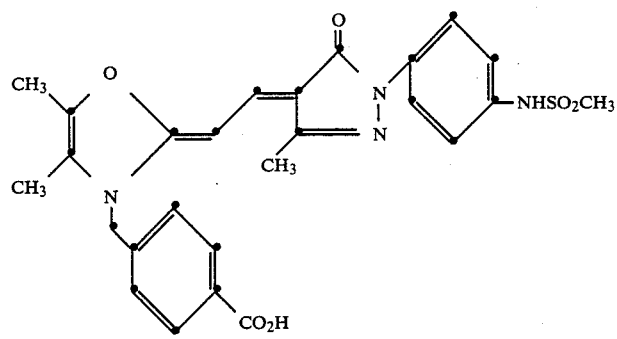
21
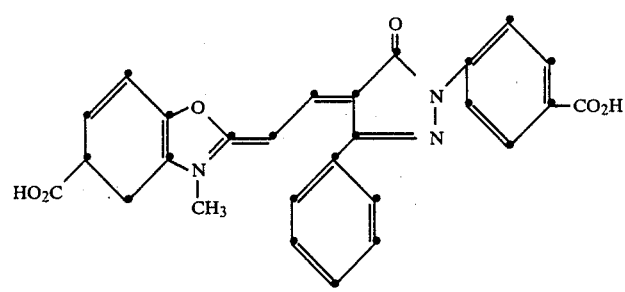
22
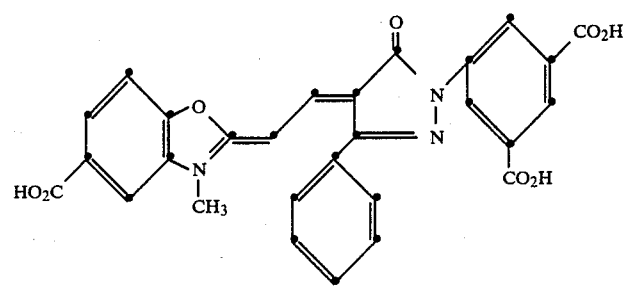
23

-continued
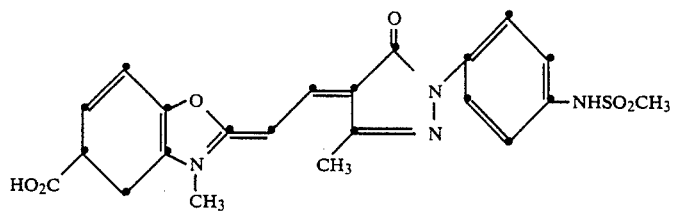
24
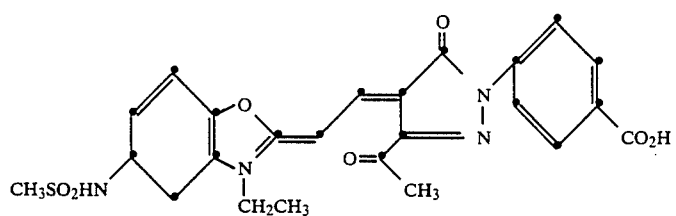
25
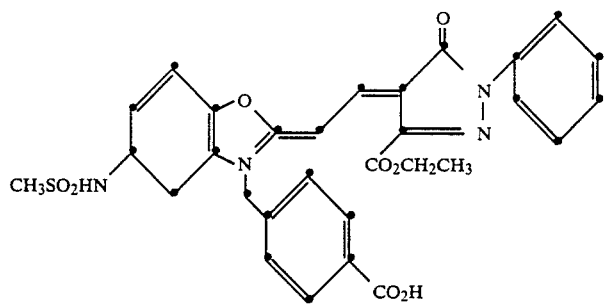
26
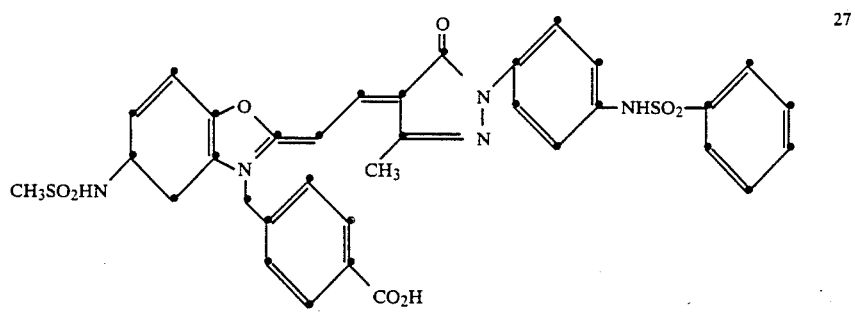
27
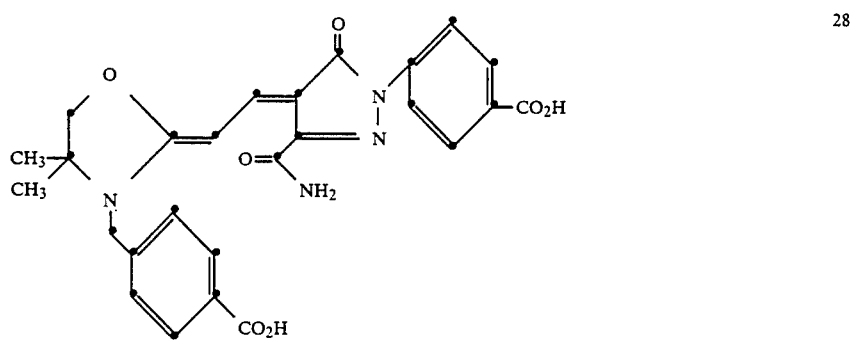
28

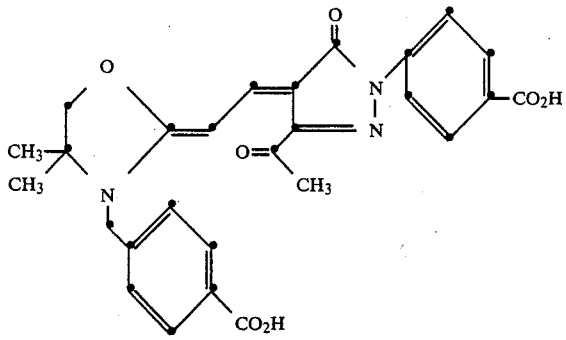

29

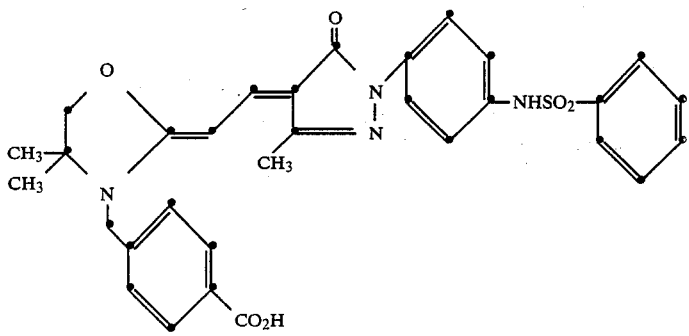

30

The dyes of formula (I) can be prepared by synthetic techniques well-known in the art, as illustrated by the synthetic examples below. Such techniques are further illustrated, for example, in "The Cyanine Dyes and Related Compounds", Frances Hamer, Interscience Publishers, 1964.

The dyes of formula (I) are preferably utilized in the form of a solid particle dispersion (i.e., the dye is in the form of crystalline or amorphous solid particles of microscopic size) for incorporation into a layer such as a hydrophilic colloid layer of a photographic element, although some of the dyes can also be incorporated in other ways, such as in the solvent phase of an "oil in water type" dispersion or in loaded polymer latex particles, such as those described in Research Disclosure, Item 19551, Jul., 1980.

The dyes may be located in any layer of the element where it is desirable to absorb light, but it is particularly advantageous to locate them in a layer where they will be solubilized and washed out during processing. Useful amounts of dye range from 1 to 1000 mg/ft$^2$. The dye should be present in an amount sufficient to yield an optical density at the transmission D-max in the visible region before processing of at least 0.10 density units and preferably at least 0.50 density units. This optical density will generally be less than 5.0 density units for most photographic applications.

The solid particle dispersion can be formed by precipitating or reprecipitating (e.g., by solvent or pH shift) the dye in the form of a dispersion and/or by well-known milling techniques, e.g., ball-milling, sand-milling, or colloid-milling the dye in the presence of a dispersing agent. The dye particles in the dispersion should have a mean diameter of less than 10 μm and preferably less than 1 μm. The dye particles can be conveniently prepared in sizes ranging down to about 0.01 μm or less.

The support of the element of the invention can be any of a number of well-known supports for photographic elements. These include polymeric films such as cellulose esters (e.g., cellulose triacetate and diacetate) and polyesters of dibasic aromatic carboxylic acids with divalent alcohols (e.g., poly(ethylene terephthalate)), paper, and polymer-coated paper. Such supports are described in further detail in Research Disclosure, Dec., 1978, Item 17643 [hereinafter referred to as Research Disclosure], Section XVII.

The radiation-sensitive layer of the element of the invention can contain any of the known radiation-sensitive materials, such as silver halide, diazo image-forming systems, light-sensitive tellurium-containing compounds, light-sensitive cobalt-containing compounds, and others described in, for example, J. Kosar, Light-Sensitive Systems: Chemistry and Application of Non-silver Halide Photographic Processes, J. Wiley & Sons, N.Y. (1965). Radiation-sensitive materials exhibiting sensitivity to blue light and especially those sensitive to blue light and at least some other wavelength of radiation are preferred, as the dyes according to the invention can be advantageously used to absorb some or all of the blue light.

Silver halide is especially preferred as a radiation-sensitive material. Silver halide emulsions can contain, for example, silver bromide, silver chloride, silver iodide, silver chlorobromide, silver chloroiodide, silver bromoiodide, or mixtures thereof. The emulsions can include coarse, medium, or fine silver halide grains bounded by 100, 111, or 110 crystal planes. Silver halide emulsions and their preparation are further described in Research Disclosure, Section I. Also useful are tabular grain silver halide emulsions, as described in Research Disclosure, Jan., 1983, Item 22534 and U.S. Pat. No. 4,425,426.

The radiation-sensitive materials described above can be sensitized to a particular wavelength range of radiation, such as the red, blue, or green portions of the visible spectrum, or to other wavelength ranges, such as ultraviolet, infrared, X-ray, and the like. Sensitization of silver halide can be accomplished with chemical sensitizers such as gold compounds, iridium compounds, or other group VIII metal compounds, or with spectral sensitizing dyes such as cyanine dyes, merocyanine dyes, styryls, or other known spectral sensitizers. Additional information on sensitization of silver halide is described in *Research Disclosure*, Sections I–IV.

The dyes of formula (I) tend to absorb light in the blue portion of the spectrum, and are thus useful in many applications requiring the use of a blue-absorbing filter dyes. For example, they can be used as interlayer dyes, trimmer dyes, or antihalation dyes. They can be used to prevent crossover in X-ray materials, to prevent unwanted blue light from reaching the green-sensitive emulsion layer of a multicolor photographic element, and other uses as indicated by the absorbance spectrum of the particular dye. The dyes can be used in a separate filter layer or as an intergrain absorber.

Multicolor photographic elements according to the invention generally comprise a blue-sensitive silver halide layer having a yellow color-forming coupler associated therewith, a green-sensitive layer having a magenta color-forming coupler associated therewith, and a red-sensitive silver halide layer having a cyan color-forming coupler associated therewith. Color photographic elements and color-forming couplers are well-known in the art and are further described in *Research Disclosure*, Section VII.

The element of the invention can also include any of a number of other well-known additives and layers, as described in *Research Disclosure*. These include, for example, optical brighteners, antifoggants, image stabilizers, light-absorbing materials such as filter layers or intergrain absorbers, light-scattering materials, gelatin hardeners, coating aids and various surfactants, overcoat layers, interlayers and barrier layers, antistatic layers, plasticizers and lubricants, matting agents, development inhibitor-releasing couplers, bleach accelerator-releasing couplers, and other additives and layers known in the art.

The dye of formula (I) can be located in any layer of a photographic element where it is desired to absorb light. In a preferred embodiment, the dye is preferably located in a layer where it will be subjected to high pH (i.e., 8 to 12) and aqueous sulfite during photographic processing, so as to allow the dye to be solubilized and removed or decolorized.

The photographic elements of the invention, when exposed, can be processed to yield an image. During processing, the dye of formula (I) will generally be decolorized and/or removed. Following processing, the dye of the invention should contribute less than 0.10 density unit, and preferably less than 0.02 density unit to the transmission D-max in the visible region in the minimum density areas of the exposed and processed element.

Processing can be by any type of known photographic processing, as described in *Research Disclosure*, Sections XIX–XXIV, although it preferably includes a high pH (i.e., 8 or above) step utilizing an aqueous sulfite solution in order to maximize decolorization and removal of the dye. A negative image can be developed by color development with a chromogenic developing agent followed by bleaching and fixing. A positive image can be developed by first developing with a non-chromogenic developer, then uniformly fogging the element, and then developing with a chromogenic developer. If the material does not contain a color-forming coupler compound, dye images can be produced by incorporating a coupler in the developer solutions.

Bleaching and fixing can be performed with any of the materials known to be used for that purpose. Bleach baths generally comprise an aqueous solution of an oxidizing agent such as water soluble salts and complexes of iron (III) (e.g., potassium ferricyanide, ferric chloride, ammonium of potassium salts of ferric ethylenediaminetetraacetic acid), water-soluble persulfates (e.g., potassium, sodium, or ammonium persulfate), water-soluble dichromates (e.g., potassium, sodium, and lithium dichromate), and the like. Fixing baths generally comprise an aqueous solution of compounds that form soluble salts with silver ions, such as sodium thiosulfate, ammonium thiosulfate, potassium thiocyanate, sodium thiocyanate, thiourea, and the like.

The invention is further illustrated by the following Examples:

SYNTHESIS EXAMPLE 1

Preparation of Dye 3

4.36 g of 1-(4-carboxyphenyl)-3-methyl-2-pyrazolinone was combined with 8.68 g acetanilidovinylbenzoxazolium iodide, 4.0 g triethylamine, and 100 ml ethanol and refluxed. After 45 minutes, an orange solid had formed. The mixture was cooled to room temperature, chilled in ice for 30 minutes, filtered, washed with ethanol and ligroin P950, and air dried to yield 7.4 g of a dull orange powder. This powder was dissolved in 200 ml methanol and 100 ml water with 20 ml triethylamine. The mixture was filtered to remove particulates and the filtrate was acidified to pH 4 with glacial acetic acid while rapidly stirring. The resulting solid was filtered and successively washed with water, ethanol, ligroin P950, and dried to yield 6.75 g of dye 3. The $\lambda$-max in methanol and triethylamine was 450 nm, $\epsilon = 7.4 \times 10^4$. NMR analysis indicated the dye had the structure of dye 3.

SYNTHESIS EXAMPLE 2

Preparation of Dye 2

5.2 g of 1-(3,5-dicarboxyphenyl)-3-methyl-2-pyrazolinone was combined with 9.5 g acetanilidovinylbenzoxazolium iodide, 6.0 g triethylamine, and 100 ml ethanol and refluxed. After 30 minutes, a dark orange precipitate had formed. The mixture was cooled to room temperature, diluted with 150 ml water, and 5 ml glacial acetic acid was added with rapid stirring. The orange precipitate was filtered, washed with 100 ml water, and dried. This material was slurried in 300 ml refluxing methanol, allowed to cool to room temperature, and stirred for an additional 20 minutes. The solid was filtered, washed with 200 ml methanol, and dried to yield 7.6 g of dye 2. The $\lambda$-max in methanol and triethylamine was 452 nm, $\epsilon = 7.19 \times 10^4$, melting point = 310° C. NMR analysis indicated the dye had the structure of dye 2.

SYNTHESIS EXAMPLE 3

Preparation of Dye 4

To a slurry of 3-acetyl-1-(4-carboxyphenyl)-2-pyrazolinone (0.75 g), 3-ethyl-2-(4-methoxy-1,3-butadienylidenyl)benzoxazolium iodide (1.08 g), and 25 ml methanol was added 1.0 ml triethylamine. The mixture was allowed to stand at room temperature for 30 minutes. The deep magenta solid was filtered and washed ethanol and ligroin, and dried to yield 0.85 g of crude dye 4. The dye was recrystallized by slurrying in 30 ml of a 2:1 mixture of ethanol and methanol, heating, chilling with ice, filtering the solid, and washing with ethanol to yield 0.80 g of dye 4. The λ-max in methanol and triethylamine was 562 nm, $\epsilon = 11.9 \times 10^4$. NMR analysis indicated the dye had the structure of dye 4.

EXAMPLES 1-7

Preparation of Solid Particle Dispersions

Dyes 1-7 were prepared as solid particle dispersions by ball-milling according to the following procedure. Water (21.7 ml) and a 6.7% solution of Triton X-200 ® surfactant (2.65 g) were placed in a 60 ml screw-capped bottle. A 1.00 g sample of dye was added to this solution. Zirconium oxide beads (40 ml, 2 mm diameter) were added and the container with the cap tightly secured was placed in a mill and the contents milled for four days. The container was removed and the contents added to a 12.5% aqueous gelatin (8.0 g) solution. The new mixture was placed on a roller mill for 10 minutes to reduce foaming and the resulting mixture was filtered to remove the zirconium oxide beads.

EXAMPLES 8-14

Dye Wandering and Solubilization

A number of dyes useful in the practice of the invention were coated as solid particle dispersions (particle sizes of 0.01 to 1.0 μm) in gelatin on polyester supports according to the following procedure. A spreading agent (surfactant 10G ®) and a hardener (bis(vinylsulfonylmethyl)ether) were added to the dye-gelatin melt prepared as described above. A melt from this mixture was then coated on a poly(ethylene terephthalate) support to achieve a dye coverage of 0.32 g/m², a gelatin coverage of 1.60 g/m², a spreading agent level of 0.096 g/m², and a hardener level of 0.016 g/m².

A comparison dye of the formula:

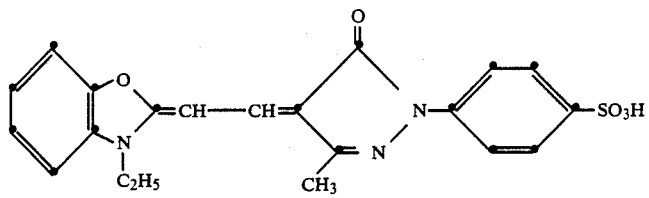

was also coated in gelatin on an identical support at identical gelatin and dye levels. The absorbance of the dye dispersions was measured with a spectrophotometer. Identical elements were subjected to a 5 minute distilled water wash, to Kodak E-6 ® Processing (which is described in *British Journal of Photography Annual*, 1977, pp. 194–97), and to Kodak Prostar ® processing (which is used commercially to process microfilm, subjecting the elements to a development step at a pH of about 11.4 for about 30 seconds), and the absorbance was measured for each. The results are presented in Table I.

TABLE I

| Dye | λ-max (nm) | Bandwidth (nm) | D-max | D-max after water Wash | D-max After E-6 ® Processing | D-max After Prostar ® Processing |
|---|---|---|---|---|---|---|
| 1 | 410 | 98 | 1.18 | 1.05 | 0.01 | 0.01 |
| 2 | 439 | 113 | 1.52 | 1.45 | — | 0.03 |
| 3 | 505 | 180 | 0.98 | 0.97 | — | 0.02 |
| 4 | 635 | 292 | 0.47 | 0.47 | — | 0.01 |
| 5 | 473 | 40 | 1.20 | 1.12 | 0.01 | 0.01 |
| 6 | 456 | 120 | 1.78 | 1.77 | 0.01 | 0.01 |
| 7 | 455 | 84 | 1.83 | 1.86 | 0.01 | 0.28 |
| comparison | 425 | 81 | 2.28 | 0.01 | — | — |

The results presented in Table I show that the dyes 1-7 according to the invention are not affected by the water wash, indicating no wandering at coating pH, but are fully solubilized for removal and/or decolorization by the photographic processing to which they were subjected. The comparison dye, on the other hand, was washed out during the water wash, indicating severe dye wandering.

The invention has been described in detail with reference to preferred embodiments thereof. It should be understood, however, that variations and modifications can be made within the spirit and scope of the invention.

What is claimed is:

1. A photographic element comprising a support having thereon a radiation-sensitive silver halide emulsion layer and a layer, which is the same as or different from the silver halide layer, comprising a hydrophilic binder, and an amount effective as a photographic filter dye of a dispersion of solid particles, said dispersion consisting essentially of a compound having the formula:

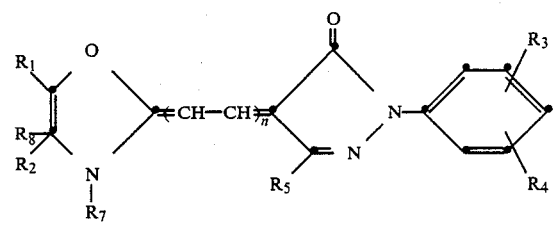

wherein $R_1$ and $R_2$ are each independently substituted or unsubstituted alkyl or aryl, or together represent the atoms necessary to complete a substituted or unsubstituted 5- or 6-membered ring, $R_3$ and $R_4$ each independently represents H, substituted or unsubstituted alkyl, substituted or unsubstituted aryl, $CO_2H$, or $NHSO_2R_6$, $R_5$ is H, substituted or unsubstituted alkyl, substituted or unsubstituted aryl, substituted or unsubstituted carboxylate, or substituted or unsubstituted acyl, $R_6$ and $R_7$ are each independently substituted or unsubstituted alkyl or substituted or unsubstituted aryl, $R_8$ is substituted or unsubstituted alkyl, or is part of a double bond between the ring carbon atoms to which $R_1$ and $R_2$ are attached, and n is 1 or 2, with the proviso that at least one of the aryl rings of the dye molecule has at least one substituent that is $CO_2H$ or $NHSO_2R_6$, the particles of said dispersion having a mean diameter of about 0.01 to 10 $\mu$m.

2. A photographic element according to claim 1 wherein $R_1$ and $R_2$ are each independently substituted or unsubstituted alkyl of from 1 to 6 carbon atoms, or together form a substituted or unsubstituted phenyl ring, $R_3$ is $CO_2H$ or $NHSO_2R_6$, $R_4$ is H, $CO_2H$, or $NHSO_2R_6$, $R_5$ is substituted or unsubstituted alkyl of from 1 to 4 carbon atoms, $R_6$ is substituted or unsubstituted aryl of from 6 to 12 carbon atoms, $R_7$ is substituted or unsubstituted alkyl from 1 to 8 carbon atoms.

3. A photographic element according to claim 1 wherein $R_1$ and $R_2$ are each methyl or together with the carbon atoms to which they are attached, form a phenyl ring, $R_3$ is $CO_2H$, $R_4$ is H or $CO_2H$, $R_5$ is methyl, and $R_7$ is ethyl.

4. A photographic element according to claim 1 wherein $R_8$ is part of a double bond between the ring carbon atoms to which $R_1$ and $R_2$ are attached.

5. A photographic element according to any of claims 1-4 wherein the particles of said dispersion have a means diameter of about 0.01 to 1 $\mu$m.

* * * * *